United States Patent
Maciejak et al.

(10) Patent No.: US 10,621,343 B1
(45) Date of Patent: Apr. 14, 2020

(54) GENERIC AND STATIC DETECTION OF MALWARE INSTALLATION PACKAGES

(71) Applicant: Fortinet, Inc., Sunnyvale, CA (US)

(72) Inventors: David Maciejak, Singapore (SG); Minh Tran, Singapore (SG)

(73) Assignee: Fortinet, Inc., Sunnyvale, CA (US)

( * ) Notice: Subject to any disclaimer, the term of this patent is extended or adjusted under 35 U.S.C. 154(b) by 162 days.

(21) Appl. No.: 15/826,969

(22) Filed: Nov. 30, 2017

(51) Int. Cl.
 *G06F 21/56* (2013.01)
 *G06N 3/08* (2006.01)
 *G06N 3/04* (2006.01)

(52) U.S. Cl.
 CPC .......... *G06F 21/562* (2013.01); *G06F 21/56* (2013.01); *G06F 2221/034* (2013.01); *G06N 3/04* (2013.01); *G06N 3/08* (2013.01)

(58) Field of Classification Search
 CPC ............ G06F 21/62–629; G06F 21/56; G06F 21/566; G06F 21/50; H04L 29/06877–06938; G06N 3/08
 See application file for complete search history.

(56) References Cited

U.S. PATENT DOCUMENTS

| | | | | |
|---|---|---|---|---|
| 9,088,601 | B2 * | 7/2015 | Friedrichs | ........... H04L 63/1416 |
| 9,639,697 | B2 * | 5/2017 | Friedrichs | ................ G06F 21/56 |
| 2013/0097706 | A1 | 4/2013 | Titonis et al. | |
| 2013/0227683 | A1 | 8/2013 | Bettini et al. | |
| 2015/0121524 | A1 | 4/2015 | Fawaz et al. | |
| 2016/0379136 | A1 | 12/2016 | Chen et al. | |
| 2018/0183815 | A1 * | 6/2018 | Enfinger | ................. G06N 20/00 |
| 2018/0307986 | A1 * | 10/2018 | Kabul | ....................... G06N 3/04 |
| 2019/0138896 | A1 * | 5/2019 | Deng | .................... G06N 3/0472 |
| 2019/0158784 | A1 * | 5/2019 | Ahn | ........................ H04N 7/147 |

FOREIGN PATENT DOCUMENTS

KR  20190056538 A  * 11/2017

OTHER PUBLICATIONS

Lee, W. et al. "Your app has a Malicious app id: Malicious Android Package Name Detection Using Recurrent Neural Networks." AVAR 2017. Nov. 22, 2017, 2 pgs.

"Automatically Prevent Highly Evasive Zero-Day Exploits and Malware." Palo Alto Networks® WildFire™. 4 pgs.

* cited by examiner

*Primary Examiner* — Meng Li
*Assistant Examiner* — Shaqueal D Wade
(74) *Attorney, Agent, or Firm* — Jaffery Watson Mendonsa & Hamilton, LLP (57) ABSTRACT

Systems and methods for generic and static detection of malware using machine learning are provided. According to one embodiment, a computing device receives an executable application or a part thereof. A package name associated with the received application is extracted. The received executable application is classified as being malicious or non-malicious based on evaluation of the package name using a language model. When the received executable application is classified as being non-malicious by the language model, then a further classification process is performed on the received executable application by extracting one or more icons associated with the received executable application. A set of icons of the one or more icons is evaluated using a deep neural network (DNN) model.

29 Claims, 6 Drawing Sheets

GENERIC AND STATIC DETECTION OF MALWARE INSTALLATION PACKAGES

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2017, Fortinet, Inc.

BACKGROUND

Field

Embodiments of the present invention generally relate to the field of cyber security. In particular, embodiments of the present invention relate to systems and methods for detecting malware installation packages in computing devices without relying on signature matching.

Description of the Related Art

Malicious software (malware) is intrusive software that can destroy or disrupt data, or gain unauthorized access by infecting a computing device. There are a variety of known types of malware including viruses, worms, Trojan horses, ransomware, spyware, adware and scareware, among others. In most cases, malware are harmful for a user as it can perform a variety of adverse activities such as stealing, encrypting or deleting sensitive data, altering core computing functions and monitoring actions of computer device without permission. Installation of malware in mobile devices can be highly dangerous as it can be used for stealing passwords and account numbers, putting false charges and even tracking location and activity of a user without their knowledge.

Many techniques have been developed to protect computing devices and mobile phones against malware attacks. Traditional malware detection methods are based on extraction of signatures from an invariant portion of the actual executable part of a target application. However, signature-based detection requires storage of a large number of known malware signatures as well as processing capacity to search for suspected malware programs with those signatures. Incorporating signature-based detection is not feasible in mobile devices as these devices are limited in storage space and computational ability.

Also, in another known technique, dynamic or behavioral analysis is performed for analysis of malware by observing behavior of the malware while the malware is actually running on a computing device. However, performing dynamic analysis can be time consuming and can include a prohibitive cost, especially while the dynamic analysis is being performed in low-power devices like mobile phones.

SUMMARY

Systems and methods are described for generic and static detection of malware using machine learning. According to one embodiment, a computing device receives an executable application or a part thereof. A package name associated with the received application is extracted. The received executable application is classified as being malicious or non-malicious based on evaluation of the package name using a language model. When the received executable application is classified as being non-malicious by the language model, then a further classification process is performed on the received executable application by extracting one or more icons associated with the received executable application. A set of icons of the one or more icons is evaluated using a deep neural network (DNN) model.

Other features of embodiments of the present invention will be apparent from the accompanying drawings and from the detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If Only the first reference label is used in the specification, the description is applicable to any one of the similar components having the same first reference label irrespective of the second reference label.

DETAILED DESCRIPTION

Systems and methods are described for generic and static detection of malware using machine learning. In the following description, numerous specific details are set forth in order to provide a thorough understanding of embodiments of the present invention. It will be apparent to one skilled in the art that embodiments of the present invention may be practiced without some of these specific details.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Systems and methods are described for generic and static detection of malware using machine learning. According to one embodiment, a method of the present disclosure includes receiving, by a computing device, an executable application or a part thereof; extracting, by the computing device, a package name associated with the received application; and classifying, by the computing device, the received executable application as being malicious or non-malicious based on evaluation of the package name using a language model such that when the received executable application is classified as being non-malicious by the language model, the method further includes the steps of performing, by the computing device, a further classification process on the received executable application by extracting one or more icons associated with the received executable application, and evaluating a set of icons from the one or more icons using a deep neural network (DNN) model.

In an aspect, the DNN model can be trained based on a corpus of icons, wherein the corpus of icons is collected by crawling for icons of legitimate applications and wherein the corpus of icons is labeled and grouped into a plurality of classes.

In another aspect, each class of the plurality of classes corresponds to one application.

In another aspect, the DNN model can incorporate machine learning.

In yet another aspect, the DNN model can be based on an inception-v4 architecture.

In another aspect, the DNN model can be developed based on normalization of icons, and training of a neural network underlying the DNN model for n steps.

In an aspect, training of the proposed neural network for n steps can be performed using Root Mean Square Propagation (RMSprop) optimizer.

In an aspect, the language model can be developed by building of a corpus of any or a combination of words, domain names, and package names; training N-gram for the corpus, wherein N is a customizable length parameter of N-gram; and labeling elements of said corpus as malicious or non-malicious, said elements being any or a combination of the words, the domain names, and the package names.

In an exemplary aspect, the language model can be trained in multiple natural languages.

In an aspect, the present disclosure further relates to a system that can include a non-transitory storage device having embodied therein one or more routines operable to detect malicious executable application, and one or more processors coupled to the non-transitory storage device and operable to execute the one or more routines, wherein the one or more routines can include: an executable application receiving module, which when executed by the one or more processors, receives an executable application or a part thereof; a package name extraction module, which when executed by the one or more processors, extracts a package name associated with the received executable application; a package name based classification module, which when executed by the one or more processors, classifies the application as being malicious or non-malicious based on evaluation of the package name using a language model; and an icon-based classification module, which when executed by the one or more processors, performs a further classification process on the received executable application when the received executable application is classified as being non-malicious by the language model by extracting one or more icons associated with the received executable application, and evaluating a set of icons from the one or more icons using a deep neural network (DNN) model.

Figure 1:
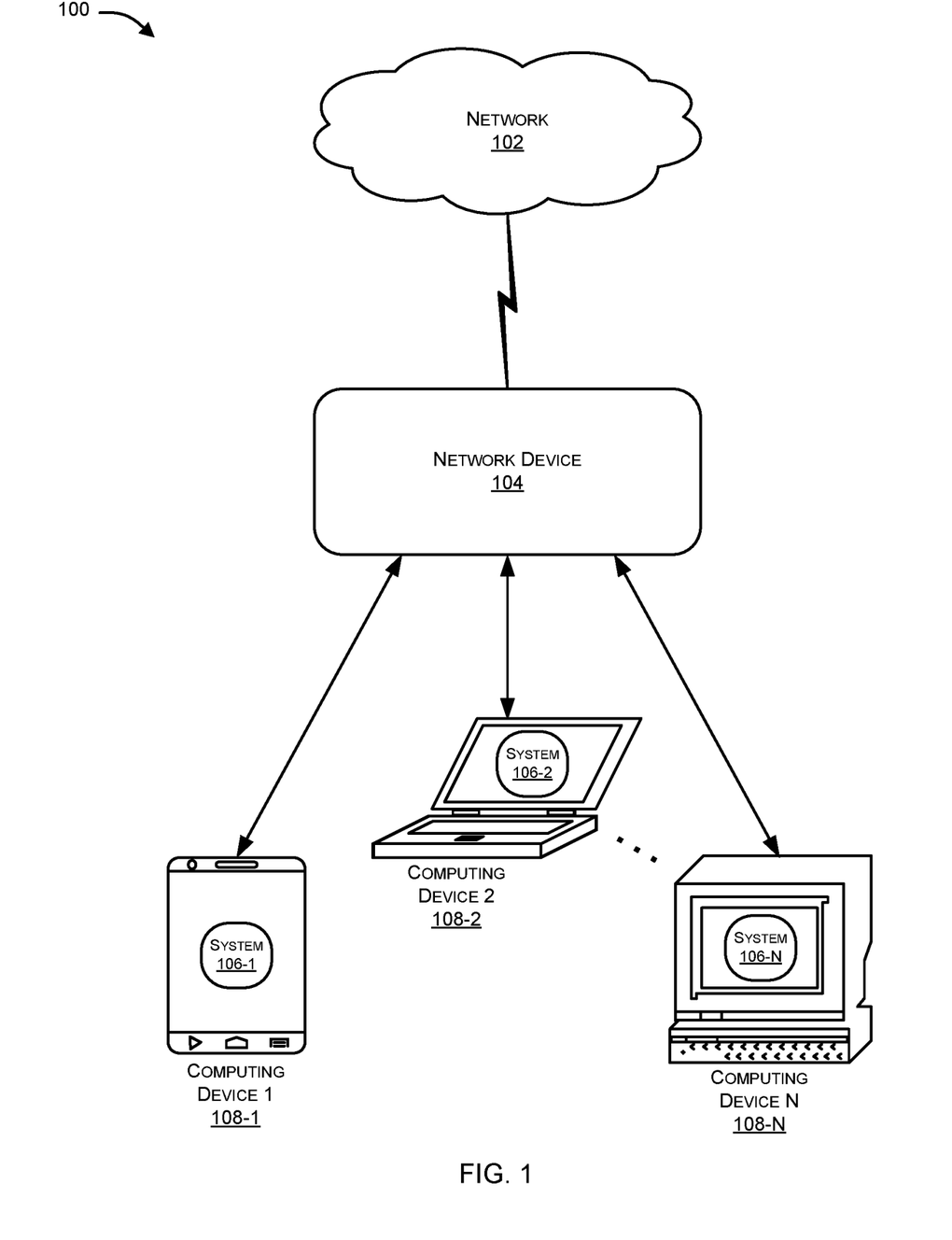
FIG. 1 illustrates an exemplary network architecture in which or with which embodiments of the present invention can be implemented.

FIG. 1 illustrates an exemplary network architecture 100 in which or with which embodiments of the present invention can be implemented.

In an embodiment, a system 106 (e.g., a signature-less malware detection solution) that can detect malicious executable application can be implemented using a network architecture 100 in which plurality of computing devices 108-1, 108-2, . . . , 108-N (which may be collectively referred to as computing devices 108 and individually referred to as computing device 108, hereinafter) can be operatively coupled to a network 102 through a network device 104 (e.g., a router or a network security device (e.g., a firewall or a unified threat management (UTM) appliance). Computing devices 108 can include endpoint or client devices, including, but not limited to, personal computers, smart devices, web-enabled devices, hand-held devices, laptops, mobile phones and the like. In an implementation, system 106 can run on any operating system, including but not limited to, Android™, iOS™, and the like.

In an aspect, computing devices 108 can receive data packets of information from network 102. Network 102 can be a wireless network, a wired network or a combination thereof that can be implemented as an Intranet, a Local Area Network (LAN), a Wide Area Network (WAN), Internet, and the like. Further, network 102 can either be a dedicated network or a shared network. A shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Further, network device 104 can be any device that enables connection of the computing devices 108 with the network 102 such as router, bridge, server, access point, gateway, hub and the like. While in some embodiments, system 106 is described as being implemented within an endpoint, in alternative embodiments one or more components or the entirety of system 106 may be implemented within a network security device (e.g., network device 104) protecting a private network with which computing device 108 is associated.

In an exemplary implementation, system 106 can evaluate and/or detect a malicious executable application on a computing device 108, wherein, responsive to receiving an executable application containing encoded instructions through network 102, system 106 can extract a package name from the executable application. For instance, when a user downloads an installation package that can be installed on his/her mobile phone or computer from the Internet, system 106 can extract the package name from the installation package.

Those skilled in the art appreciate that package names, such as the unique application ID of an Android app, are unique identifiers for identifying an application on the computing device. Android package names are written in all lower case to avoid conflict with the names of classes or interfaces and are generally represented in the form of a Java package name. Further, legitimate or non-malicious applications generally have package names that are distinctively different from those of malicious applications. Companies typically use their reversed Internet domain name to begin their package names, for example, "com.example.myapp" for an app named "myapp" created by a programmer at example.com. For example, "com.google.android.youtube" is a non-malicious package that contains all the interfaces and classes of the YouTube Android Player application programming interface (API) and "com.symantec.mobilesecurity" is a non-malicious package representing the Symantec Mobile Security Agent used to enable protection and security for Android handsets and tablets. Based on these examples and other empirical data, it can be inferred that package names of non-malicious applications generally contain company names and/or meaningful or familiar words. On the other hand, package names of malicious applications generally contain sequences of random letters or characters, for example, "etcqlnzwauf.hflivryhdnjb" as the package names of malicious applications are typically programmatically generated.

According to an embodiment, system 106 can evaluate the package name using a language model, and based on the evaluation by system 106, can classify the executable application as being malicious or non-malicious. To develop a language model, system 106 can, in an exemplary embodiment, build a corpus containing a collection of words, domain names, and package names. Further, system 106 can train an N-gram for the corpus in which N can be a customizable length parameter of N-gram. As those skilled in the art will appreciate, an N-gram is a sequence of N co-occurring letters or words that can be taken from the corpus and are extensively used for text mining and natural language processing. In one embodiment, a trigram (i.e., N=3) can be used for training as testing has revealed this to yield the most predictive power. Further, system 106 can label elements of the corpus including the words, the domain names, and the package names as malicious or non-malicious. In an embodiment, the labeling can be done based on package names of existing malicious applications.

According to an embodiment, once the training of the N-gram is concluded, the language model can be evaluated using a testing corpus of text including words, company names, malicious and non-malicious package names, and the like. If the language model does not give adequate results on evaluation, retraining of the N-gram can be performed by building a corpus containing more words, package names and domain names such that the quality of the language model is improved. In an embodiment, system 106 can train the language model in multiple natural languages. For example, the language model can be trained in languages such as English, Chinese and Russian in which most of the malicious applications have their package names.

In an instance, when the executable application is classified as non-malicious by the language model, system 106 can perform a further classification process by extracting one or more icons associated with the received executable application and evaluating a set of icons from the one or more icons using a deep neural network (DNN) model. In an embodiment, a visual anchor that is bundled with executable applications can contain one or more images or icons in multiple sizes ranging from smaller size, for example, 29×29 pixels to a larger size, for example, 1024×1024 pixels. System 106 can extract these icons from the received executable application.

Those skilled in the art appreciate malicious applications often use social engineering tricks to make users believe that they are interacting with legitimate or non-malicious applications. As a result, the users are lulled into invoking and/or installing the malicious applications. For instance, malicious applications often use icons resembling those of well-known legitimate applications, such as WhatsApp™, Facebook™, Adobe Flash™ and the like. A simple hash will not be able to detect this because of the very nature of cryptographic hash. Even if a single pixel in the icon is changed, the hash code of the icon significantly changes. Thus, comparison of simple hash codes may not be able to detect the changed icons. In light of the foregoing, for evaluation of the extracted icons, system 106 can develop the above-mentioned DNN model that can be based on machine learning.

According to an embodiment, the DNN model is trained based on a corpus of icons that can be collected by crawling for icons of legitimate applications or non-malicious applications. The corpus of icons can be labeled and grouped into multiple classes such that each class can correspond to one application. For instance, icons can be crawled for using image search via a search engine, for example Google™ images and the icons can be grouped into separate classes pertaining to say WhatsApp™, Facebook™ and Adobe Flash™. Say class A can contain all icons pertaining to WhatsApp™ application. Similarly, class B can contain all icons pertaining to Facebook™ application and class C can contain all icons pertaining to Adobe Flash™ application.

According to an embodiment, the DNN model can be developed based on normalization of icons by converting the icons into an internal format such that the icons can be organized and stored in a machine-readable format. Further, one or more neural networks underlying the DNN model can be trained for n-steps. To provide higher efficiency, 'n' can have a large value (for example, n=3000) and the training can be performed using a Root Mean Square Propagation (RMSprop) optimizer.

As will be appreciated by those skilled in the art, for training a neural network model, one can select one model from numerous available algorithms that use application of optimization theory and statistical estimation. Most algorithms employ some form of gradient descent, using backpropagation to compute the actual gradients. RMSProp is a gradient-based optimization technique that implements the RMSProp algorithm. The RMSProp algorithm can be combined with the backpropagation algorithm for training neural networks.

According to an embodiment, once the training of the neural network is concluded, the DNN model can be evaluated using a testing corpus of icons and images. If the DNN model does not provide satisfactory results, the DNN model can be retrained by building a corpus containing more icons and images.

In an embodiment, the DNN model can be based on an inception-v4 architecture that can implement residual connections for accelerated training of the neural networks. The inception-v4 architecture is capable of providing very good performance at relatively low computational cost. Alternative DNNs for classifying images using convolutional neural networks include VGGNet and AlexNet.

Figure 2:
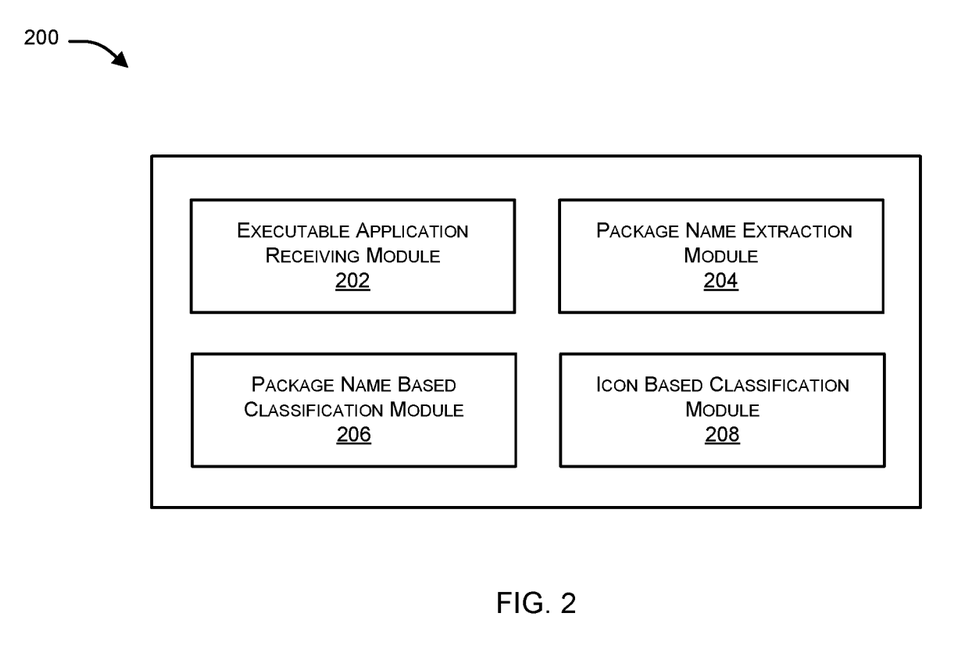
FIG. 2 illustrates an exemplary module diagram for detecting a malicious executable application in accordance with an embodiment of the present invention.

FIG. 2 illustrates an exemplary module diagram of a system 200 for detecting a malicious executable application in accordance with an embodiment of the present invention.

In an embodiment, system 200 includes an executable application receiving module 202, a package name extraction module 204, a package name based classification module 206 and an icon-based classification module 208. In an embodiment, executable application receiving module 202 can be configured to receive an executable application by the system.

The executable application can be installation packages or executable files that can executed/run or be installed on a computing device. The executable files typically have a file name extension of .apk, .bat, .com, or .exe. In an embodiment, the executable application receiving module 202 can receive the executable application from the Internet or any other network connected with the computing device. For example, a user can download an executable file from an e-mail attachment, or websites that provide free software or software for purchase, (e.g., Google Play or Apple's App Store).

Those skilled in the art appreciate that each executable application is associated with a package name (e.g., the application ID of an Android app) that provides a unique identifier of the application. Thus, using a package name one can identify a specific application. In an embodiment, the package name extraction module 204 can be configured to extract the package name of the received executable application. Generally, the package name of an application is in the format "domain.company.application" where the domain portion is the domain extension, for example, corn or org, the company portion is the company name of the developer and the application portion pertains to the application itself. However, the developer of the application has complete discretion to choose the package name.

Further, package names of legitimate or non-malicious applications can be significantly different from the package names of malicious applications. The package names of legitimate applications can contain familiar, well-known or meaningful words and company names, while, package names of malicious applications can contain a combination of random letters or unfamiliar words. For example, "com.google.android.youtube" and "com.symantec.mobilesecurity" are package names of non-malicious applications, while "etcqlnzwauf.hflivryhdnjb" is a package name of an exemplary malicious application. However, in certain cases package names of malicious applications contain meaningful words or may resemble package names of non-malicious applications. For example, "com.newac.wallpaper" and "com.yeahmobi.horoscope" are package names of malicious applications that contain meaningful words such as "horoscope" and "wallpaper".

In an embodiment, the package name based classification module 206 can be configured to classify the executable application as being malicious or non-malicious based on evaluation of the package name using a language model. For developing the language model a corpus containing a collection of words, domain names, and package names can be built. For example, meaningful words, names of companies/organizations, package names, etc. can be obtained to build the corpus.

In an embodiment, for developing the language model, the corpus can be pre-processed, for example, the text can be converted to lower case and digits and special can be removed from elements of the corpus. Further, the language model can be based on an N-gram model that is used to compute the probability of a sequence of words or letters. The N-gram can pertain to a sequence of N co-occurring letters or words taken from the corpus that can be extracted and trained. In an embodiment, the N-gram model language model can be developed based on the Natural Language Toolkit (NKTL) and python.

Furthermore, the elements of the corpus including the words, the domain names, and the package names can be labeled as malicious or non-malicious. In one exemplary embodiment, the labeling can be done based on package names of existing malicious applications.

In an implementation, with N=3 in the N-gram language model, a false-negative (FN) rate that is the rate of malicious samples that have been misclassified, was achieved to be low (7.67%). Thus, in one embodiment, N can be taken as 3, that is, a trigram can be considered for the N-gram language model.

Further, in an embodiment, the language model can be tested using a testing corpus. Should the language model be deemed insufficient to classify an adequate number of package names or applications correctly, the N-gram can be retrained by building a corpus containing more words, package names and domain names in order to increase the accuracy and efficiency of the language model. Also, for further enhancing the language model, in an embodiment, the language model can be trained in multiple natural languages in which package names of malicious apps are observed to be represented. For example, the language model can be trained in English, Chinese and/or Russian.

Thus, the language model may effectively detect malicious applications based on the package name of the application. However, a lack of detection by the language model may result in false negatives as the detection rate using the language model itself may not be sufficient. For example, due to a resemblance of a package name of a malicious application with that of a legitimate application, package name based classification module 206 may classify malicious application as non-malicious application based on the developed language model. For instance, "com.yeahmobi.horoscope" can be a package name of a malicious application and "com.yeahmobile.horoscope" can be a package name of non-malicious application. The similarity of these exemplary package names may result in the language model used by package name based classification module 206 to incorrectly classify the malicious application as non-malicious application. Thus, to further strengthen the detection of such malicious applications, which the package name based classification module 206 may not be able to detect, the system of the present disclosure can perform a further classification process.

According to one embodiment of the present invention, when the executable application is classified as non-malicious by the language model, a further classification process can be performed by icon-based classification module 208. Icon-based classification module 208 can be configured to extract one or more icons associated with the received executable application. Those skilled in the art appreciate that an executable application or the file associated therewith contains a collection of all resources that the application can use after installation; for example, the executable application may contain sounds, pictures, text, fonts, etc. In an embodiment, a visual anchor bundled with an executable application can contain images, icons, pictures, clip-art, etc. (which may be collectively referred to as icons herein). These icons can be of multiple sizes ranging from a small size (for example, 29×29 pixels) to a large size (for example, 1024×1024 pixels) and can be extracted from the received executable application by icon-based classification module 208. In an embodiment, the extraction of files can be done based on various file formats of image files, for example, .jpg, .png, .gif, .bmp, etc.

Further, icon-based classification module 208 can evaluate a set of icons that can be formed from the extracted icons using a deep neural network (DNN) model. Those skilled in the art appreciate that neural networks used for image recognition are modelled loosely on the human brain and can be designed to recognize patterns. The DNN model can interpret sensory data through machine perception, labelling or clustering raw input.

According to an embodiment, for developing the DNN model, a corpus of icons can be collected by crawling the Internet for icons of legitimate applications or non-malicious applications. In an example, icons can be crawled for using a search engine that enable searching of image content say Google™ image search, Yahoo™ image search, and the like. For example, images pertaining to various applications say Youtube™, Facebook™, Whatsapp™, etc. can be collected using one or more known image search engines.

Further, as neural networks are based on clustering and classification, in an embodiment, the corpus of icons can be labeled and grouped into multiple classes. Such labeling and grouping can be done such that each class can correspond to one application. For example, the crawled icons can be grouped into classes A, B and C such that class A pertains to icons commonly associated with Youtube™, class B pertains to icons found to be used with Facebook™ and class C pertains to icons used by Whatsapp™.

According to an embodiment, for developing DNN model, icons can be normalized, that is, the icons can be converted to an internal format or numerical patterns for organization and storage of icons in a machine-readable format.

The DNN model can be based on an iterative learning or training process in which data cases can be presented to the neural network one at a time, and weights associated with the input values can be adjusted each time. After all the data cases are presented, the process of training can start over again. During such training, the neural network can learn by adjusting the weights so as to be able to predict the correct label of input data. Thus, in an embodiment, neural networks underlying the DNN model can be trained for n-steps or n-iterations using the corpus of icons. To provide higher efficiency, n can have a large value (for example, n=3000).

In an embodiment, the training can be performed using a Root Mean Square Propagation (RMSprop) optimizer that is based on a gradient-based optimization technique using RMSProp algorithm. Further, the RMSProp algorithm can also be combined with a backpropagation algorithm for effective training of the neural network.

According to an embodiment, the DNN model can be evaluated using a testing corpus of icons. Should the DNN model provide inadequate results, the DNN model can be retrained by building a larger corpus containing more icons and images to increase efficiency of the system of the present disclosure over a period of time. In an embodiment, the DNN model can be based on an inception-v4 architecture that can implement residual connections to accelerate training of the neural networks.

Figure 3:
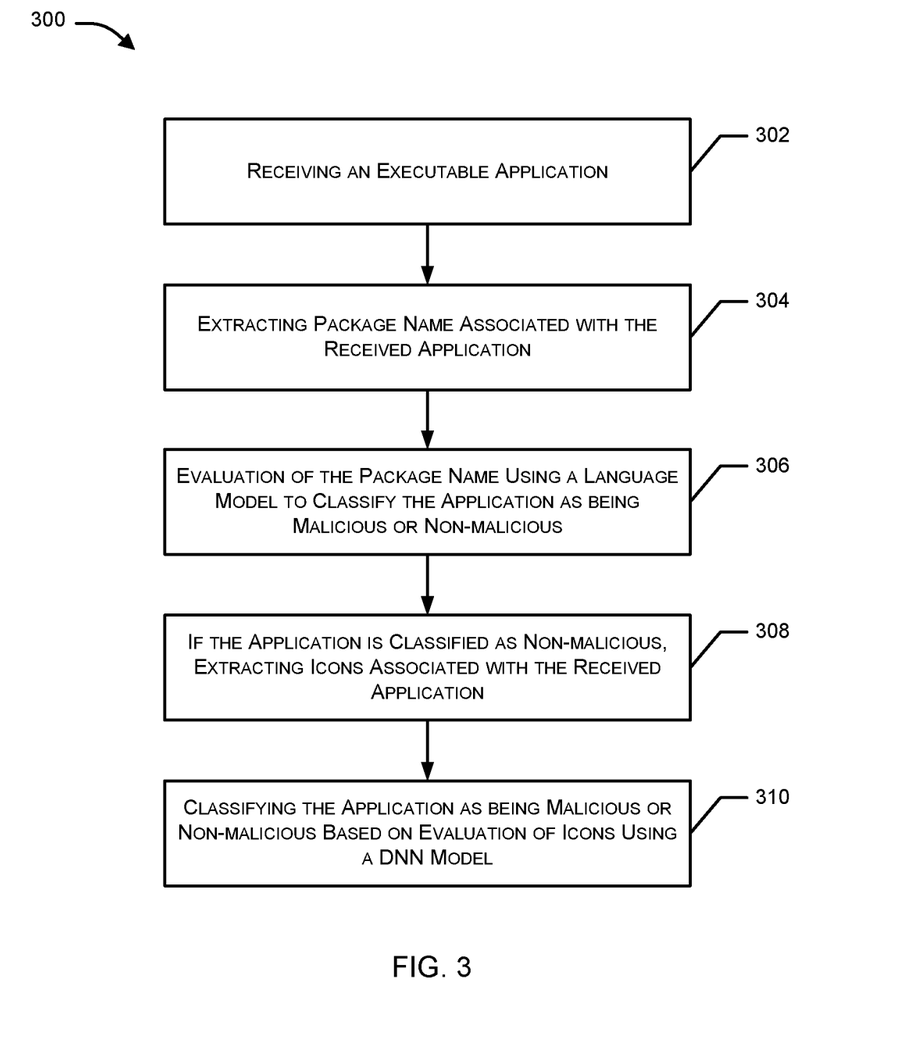
FIG. 3 is a flow diagram illustrating a process for detecting a malicious executable application in accordance with an embodiment of the present invention.

FIG. 3 is a flow diagram 300 illustrating a process for detecting a malicious executable application in accordance with an embodiment of the present invention.

According to an exemplary embodiment, flow diagram 300 represents a method for detecting a malicious executable application (e.g., a malicious mobile app). At step 302, the computing device can receive an executable application or a part thereof from the network. The executable application can be in the form of an installation package or an executable file that can be installed or run on a computing device. At step 304, a package name associated with the received application can be extracted. The package name can be a unique name that is used to identify the executable application. At step 306, the package name can be evaluated using a language model to classify the executable application as being malicious or non-malicious. At step 308, if the application is classified as non-malicious by using the language model, one or more icons associated with the application can be extracted. At step 310, the extracted icons can be evaluated using a deep neural network (DNN) model.

Figure 4A:
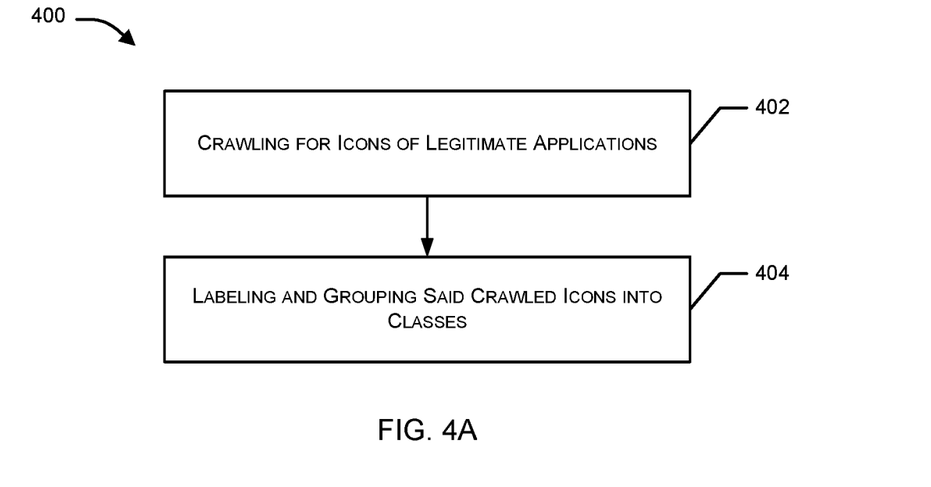
FIGS. 4A-B are flow diagrams illustrating a process for developing a deep neural network (DNN) model in accordance with an embodiment of the present invention.
Figure 4B:
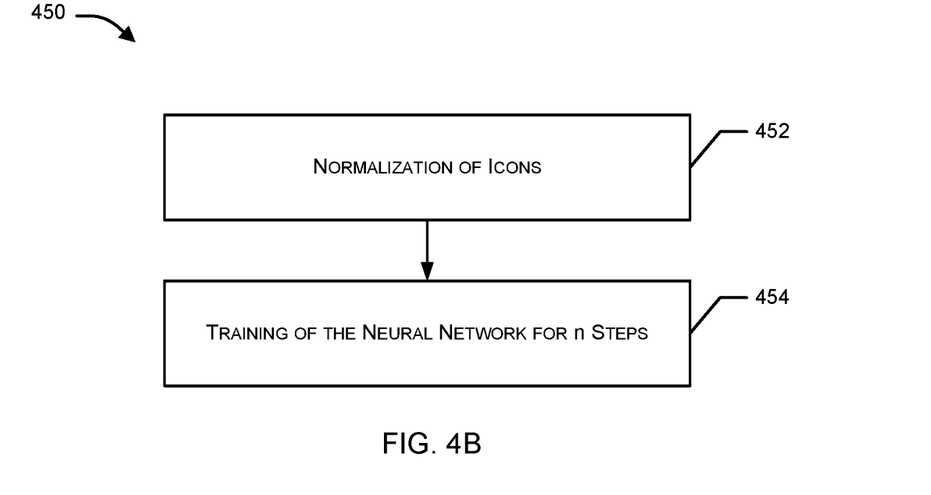

FIGS. 4A-B are flow diagrams 400 and 450 illustrating a process for developing a deep neural network (DNN) model in accordance with an embodiment of the present invention.

FIG. 4A illustrates a process for building a corpus of icons. At step 402, the corpus can be built by crawling the Internet for icons of legitimate applications or non-malicious applications. Further, at step 404, the icons found during the crawling process can be labeled and grouped into multiple classes such that each class can correspond to one application. In one embodiment, icons can be found using image search functionality of a search engine and the icons found can be grouped into separate classes pertaining to separate applications say WhatsApp™, Facebook™ and Adobe Flash™.

FIG. 4B illustrates a process for training of the DNN model. In an embodiment, the process can be initialized in accordance with step 452 that pertains to normalization of icons that can incorporate conversion of the icons into an internal format. Further, at step 454 the neural networks underlying the DNN model can be trained for n-steps. In an embodiment, the training of the DNN model can be performed using RMSprop optimizer and n can have a large value (for example, n=3000) that increases efficiency of the DNN model. Also, once the training of the neural network is concluded, the DNN model can be evaluated using a testing corpus of icons and images, and in case the DNN model does not provide adequate result, retraining of the DNN model can be performed by building corpus containing more icons and images.

Figure 5:
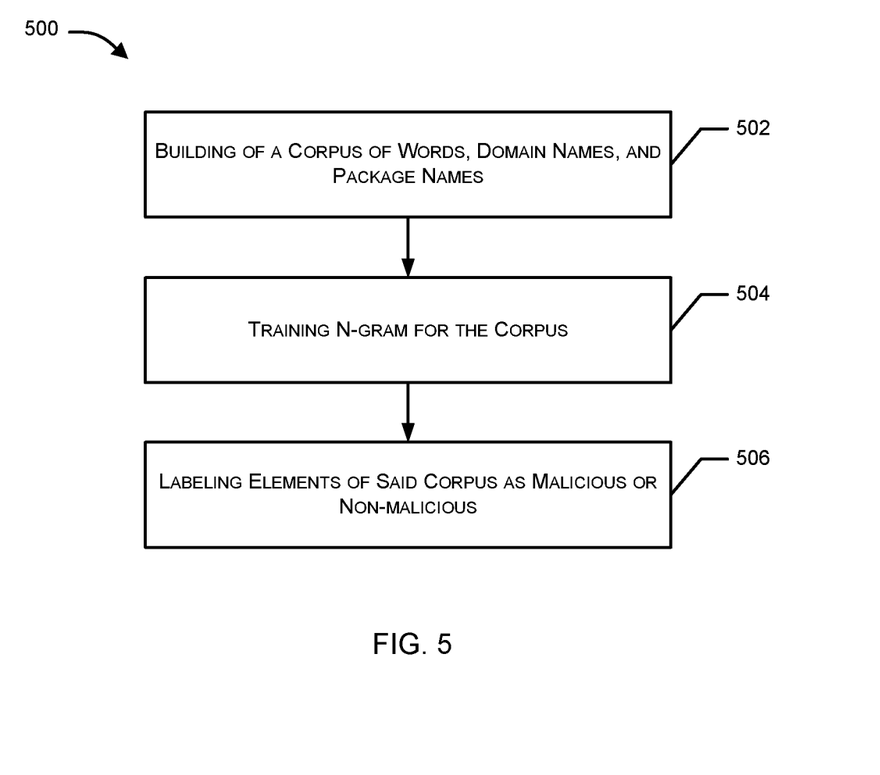
FIG. 5 is a flow diagram illustrating a process for developing language model in accordance with an embodiment of the present invention.

FIG. 5 is a flow diagram 500 illustrating a process for developing a language model in accordance with an embodiment of the present invention.

According to the present example, at step 502, a corpus containing collection of words, domain names, and package names can be built. Further, at step 504, system 106 can train an N-gram for the corpus, in which N can be a customizable length parameter of the N-gram. As those skilled in the art appreciate, the N-gram can be sequence of N co-occurring letters or words that can be taken from the corpus. Furthermore, at step 506, elements of the corpus including the words, the domain names, and the package names can be labeled as malicious or non-malicious. In an embodiment, the labeling can be done based on package names of existing malicious applications.

According to an embodiment, the developed language model can be evaluated using a testing corpus of text including words, company names, malicious and non-malicious package names, and the like, and if the language model does not provide adequate results on evaluation, retraining of the N-gram can be performed by building a larger corpus containing more words, package names and domain names to increase efficiency of the language model over a time period. In an embodiment, the language model can be trained in multiple natural languages in which most observed malicious applications have their package names, for example, English, Chinese and Russian.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

In view of the fact that the language model will need to be retrained periodically in order to adjust to malware trends, those skilled in the art will appreciate that training performance is a factor to be considered. Additionally, increased training performance allows for a larger data set to be used for training, thereby improving malware detection quality. In an embodiment, training time for the language model and the DNN model is reduced by splitting the data set or corpus and incorporating distributed training using multiple computing devices. At each computing device, the training can be accelerated by employing Graphics Processing Units (GPUs) and rebuilding the models to support OpenCL™ or the CUDA™ platform. In another implementation, the training time of the DNN model (e.g., Inception-v4) was decreased by leveraging advanced instructions like Advanced Vector Extensions (AVX), Advanced Vector Extensions 2 (AVX2), fused multiply-add (FMA), etc. typically found in processors like Intel's Skylake microarchitecture. In such an implementation, the training time was reduced to 1.26 sec/step.

In terms of effectiveness and efficiency, in embodiments of the present invention in which N=3 in the language model and based on testing of 3,068,47 samples or applications, the observed False Negative (FN) rate (i.e., the rate of malicious samples that were misclassified as non-malicious) was 7.67%. Further, in another implementation, incorporating the DNN model with n=3000 steps and testing 421 samples, only 4 samples were misclassified, thus, yielding FN rate of 0.95%.

In an implementation, by combining both the language model as well as the DNN model, the observed FN rate drop down to 0.072%, thus improving the detection rate to 99.928%.

In one embodiment, the time taken to classify unknown samples was achieved to be 15 seconds, which is about 20 times faster than conventional techniques used for malware detection.

Further, embodiments of the present disclosure provide better coverage as the system can detect malicious application even if the application is corrupted as embodiments of the present invention are effectively performing static analysis. Thus, embodiments of the present invention provide better efficiency than dynamic analysis and do not require execution in a sandbox.

Figure 6:
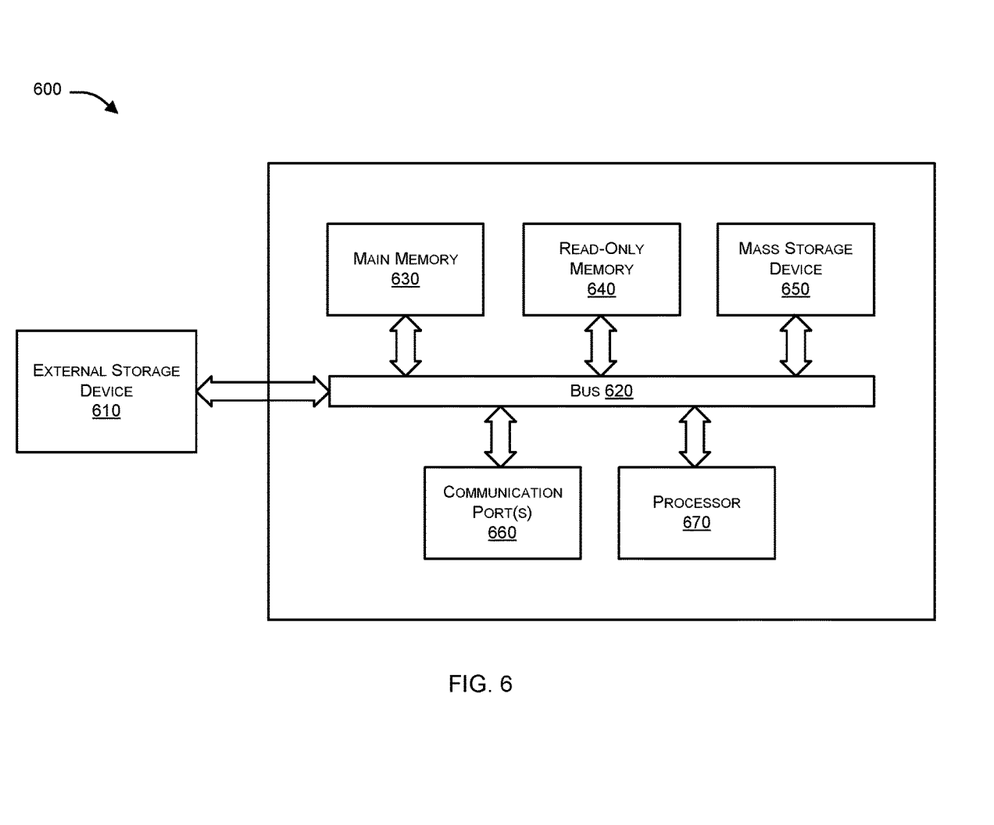
FIG. 6 illustrates an exemplary computer system in which or with which embodiments of the present invention can be utilized in accordance with embodiments of the present disclosure.

FIG. 6 illustrates an exemplary computer system 600 in which or with which embodiments of the present invention can be utilized in accordance with embodiments of the present disclosure. As shown in FIG. 6, computer system 600 includes an external storage device 610, a bus 620, a main memory 630, a read only memory 640, a mass storage device 650, communication port 660, and a processor 670. Computer system 600 may represent all or a portion of an endpoint or client device (e.g., computing device 108), including, but not limited to a tablet computer, a smartphone, a laptop computer or the like. Alternatively, computer system 600 may represent all or a portion of a network security device (e.g., network device 104) or a workstation or server on which the training is performed.

A person skilled in the art will appreciate that computer system 600 may include more than one processor and communication ports. Examples of processor 670 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 670 may include various modules associated with embodiments of the present invention. Communication port 660 can be any of an RS-232 port for use with a modem based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system connects.

Memory 630 can be Random Access Memory (RAM), or any other dynamic storage device commonly known in the art. Read only memory 640 can be any static storage device(s) e.g., but not limited to, a Programmable Read Only Memory (PROM) chips for storing static information e.g., start-up or BIOS instructions for processor 670. Mass storage 650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 620 communicatively couples processor(s) 670 with the other memory, storage and communication blocks. Bus 620 can be, e.g. a Peripheral Component Interconnect (PCI)/ PCI Extended (PCI-X) bus, Small Computer System Interface (SCSI), USB or the like, for connecting expansion cards, drives and other subsystems as well as other buses, such a front side bus (FSB), which connects processor 670 to software system.

Optionally, operator and administrative interfaces, e.g. a display, keyboard, and a cursor control device, may also be coupled to bus 620 to support direct operator interaction with computer system. Other operator and administrative interfaces can be provided through network connections connected through communication port 660. External storage device 610 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim. In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, to avoid obscuring the present invention.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
    receiving, by a computing device, an executable application or a part thereof;
    extracting, by the computing device, a package name associated with the received application;
    classifying, by the computing device, the received executable application as being malicious or non-malicious based on evaluation of the package name using a language model; and
    when the received executable application is classified as being non-malicious by the language model, performing, by the computing device, a further classification process on the received executable application by:
        extracting one or more icons associated with the received executable application; and
        evaluating a set of icons from the one or more icons using a deep neural network (DNN) model.

2. The method of claim 1, wherein the DNN model is trained based on a corpus of icons, wherein the corpus of icons are collected by crawling for icons of legitimate applications and wherein the corpus of icons are labeled and grouped into a plurality of classes.

3. The method of claim 2, wherein each class of the plurality of classes corresponds to one application.

4. The method of claim 1, wherein the DNN model incorporates machine learning.

5. The method of claim 1, wherein the DNN model is based on an inception-v4 architecture.

6. The method of claim 1, wherein the DNN model is developed based on normalization of icons, and training of a neural network underlying the DNN model for n steps.

7. The method of claim 6, wherein said training of the neural network for n steps is performed using Root Mean Square Propagation (RMSprop) optimizer.

8. The method of claim 1, wherein the language model is developed by:
building of a corpus of any or a combination of words, domain names, and package names;
training an N-gram for the corpus, wherein N is a customizable length parameter of the N-gram; and
labeling elements of said corpus as malicious or non-malicious, said elements being any or a combination of the words, the domain names, and the package names.

9. The method of claim 1, wherein the language model is trained in multiple natural languages.

10. The method of claim 1, wherein said classifying, by the computing device, the received executable application as being malicious or non-malicious based on evaluation of the package name using a language model comprises classifying the received executable using the language model based solely on the package name.

11. The method of claim 1, wherein the received executable application employs a social engineering technique to lull an end user of the computing device to invoke or install the received executable application.

12. The method of claim 11, wherein the social engineering technique comprises use of the one or more icons, including an icon that resembles an icon associated with a well-known legitimate application.

13. The method of claim 1, wherein the computing device comprises a mobile device.

14. The method of claim 13, wherein the mobile device comprises a mobile phone.

15. A system comprising:
a non-transitory storage device having embodied therein one or more routines operable to detect malicious executable application; and
one or more processors coupled to the non-transitory storage device and operable to execute the one or more routines, wherein the one or more routines include:
an executable application receiving module, which when executed by the one or more processors, receives an executable application or a part thereof;
a package name extraction module, which when executed by the one or more processors, extracts a package name associated with the received executable application;
a package name based classification module, which when executed by the one or more processors, classifies the application as being malicious or non-malicious based on evaluation of the package name using a language model; and
an icon-based classification module, which when executed by the one or more processors, performs a further classification process on the received executable application when the received executable application is classified as being non-malicious by the language model by:
extracting one or more icons associated with the received executable application; and
evaluating a set of icons from the one or more icons using a deep neural network (DNN) model.

16. The system of claim 15, wherein the DNN model is trained based on a corpus of icons, wherein the corpus of icons are collected by crawling for icons of legitimate applications and wherein the corpus of icons are labeled and grouped into a plurality of classes.

17. The system of claim 16, wherein each class of the plurality of classes corresponds to one application.

18. The system of claim 15, wherein the DNN model incorporates machine learning.

19. The system of claim 15, wherein the DNN model is based on an inception-v4 architecture.

20. The system of claim 15, wherein the DNN model is developed based on normalization of icons, and training of a neural network underlying the DNN model for n steps.

21. The system of claim 20, wherein said training of the neural network for n steps is performed using Root Mean Square Propagation (RMSprop) optimizer.

22. The system of claim 15, wherein the language model is developed by:
building of a corpus of any or a combination of words, domain names, and package names;
training an N-gram for the corpus, wherein N is a customizable length parameter of the N-gram; and
labeling elements of said corpus as malicious or non-malicious, said elements being any or a combination of the words, the domain names, and the package names.

23. The system of claim 15, wherein the language model is trained in multiple natural languages.

24. The system of claim 15, wherein package name based classification module classifies the application using the language model based solely on the package name.

25. The system of claim 15, wherein the received executable application employs a social engineering technique to lull an end user of the computing device to invoke or install the received executable application.

26. The system of claim 25, wherein the social engineering technique comprises use of the one or more icons, including an icon that resembles an icon associated with a well-known legitimate application.

27. The system of claim 15, wherein the system comprises a mobile device.

28. The system of claim 27, wherein the mobile device comprises a mobile phone.

29. A non-transitory computer-readable storage medium embodying a set of instructions, which when executed by one or more processors of a mobile device, causes the one or more processors to perform a method comprising:
receiving an executable application or a part thereof;
extracting a package name associated with the received application;
classifying the received executable application as being malicious or non-malicious based on evaluation of the package name using a language model, wherein the language model detects, among other indications of malware, whether the package name is suggestive of the package name being programmatically generated; and
when the received executable application is classified as being non-malicious by the language model, performing a further classification process on the received executable application by:
extracting one or more icons associated with the received executable application; and
detecting use of a social engineering technique by the received executable application involving exploitation of an icon resembling that of a well-known legitimate application or company by the received executable application by evaluating a set of icons from the one or more icons using a deep neural network (DNN) model.

* * * * *